(12) United States Patent
Ahmed et al.

(10) Patent No.: US 10,862,716 B2
(45) Date of Patent: *Dec. 8, 2020

(54) OPTICAL DOMAIN EQUALIZATION FOR COHERENT OPTICAL RECEIVERS

(71) Applicant: Elenion Technologies, LLC, New York, NY (US)

(72) Inventors: Abdelrahman Ahmed, Brooklyn, NY (US); Ruizhi Shi, New York, NY (US); Alexander Rylyakov, Staten Island, NY (US); Richard C. Younce, Naperville, IL (US)

(73) Assignee: Elenion Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,156

(22) Filed: Sep. 19, 2019

(65) Prior Publication Data

US 2020/0014566 A1 Jan. 9, 2020

Related U.S. Application Data

(63) Continuation of application No. 16/016,158, filed on Jun. 22, 2018, now Pat. No. 10,461,967.

(51) Int. Cl.
*H04B 10/61* (2013.01)
*H04L 25/03* (2006.01)

(52) U.S. Cl.
CPC ....... *H04L 25/03057* (2013.01); *H04B 10/61* (2013.01)

(58) Field of Classification Search
CPC .................................................. H04B 10/615
See application file for complete search history.

(56) References Cited

U.S. PATENT DOCUMENTS

| | | | | |
|---|---|---|---|---|
| 10,461,967 B1* | 10/2019 | Ahmed | ............... | H04B 10/616 |
| 2010/0074632 A1* | 3/2010 | Zhou | ................... | H04B 10/614 |
| | | | | 398/208 |
| 2012/0251118 A1* | 10/2012 | McNicol | ............... | H04B 10/61 |
| | | | | 398/82 |

OTHER PUBLICATIONS

Inagaki et al., "Direct Measurement on Frequency Response of Common Mode Rejection Ratio in Coherent Receiver", ECOC 2016, Sep. 2016.*

* cited by examiner

*Primary Examiner* — Shi K Li
(74) *Attorney, Agent, or Firm* — Stratford Managers Corporation

(57) ABSTRACT

An optical coherent receiver includes an optical hybrid (OH) configured to mix signal and reference light, and two back-end optical ports. An optical equalizing network interconnects two 180° OH output ports with the two back-end optical ports so that each back-end optical port receives light from each of the two OH output ports. Optical signals from each of the two back-end optical ports are converted to electrical signals that are fed to a differential amplifier. Adjusting coupling ratios and/or optical delays in the optical equalizing network reduces an OSNR penalty of a lower-bandwidth differential amplifier.

20 Claims, 10 Drawing Sheets

OPTICAL DOMAIN EQUALIZATION FOR COHERENT OPTICAL RECEIVERS

CROSS REFERENCE TO RELATED APPLICATION

This application is a continuation of U.S. patent application Ser. No. 16/016,158, filed Jun. 22, 2018, now allowed, which is hereby incorporated by reference in their entirety.

TECHNICAL FIELD

The present invention generally relates to optical receivers, and more particularly relates to a high-speed coherent optical receiver with signal equalization.

BACKGROUND

Broad-band optical communications typically require high-speed optical receivers capable of converting high data rate signals from optical to electrical domain. Noise characteristics of an optical receiver are usually of importance, as lower added noise means higher receiver sensitivity, which allows to use lower-power transmitters or transmit light signals over a greater distance, with greater optical loss in the receiver-transmitter path.

Accordingly, optical receivers that are capable of operating at high data rates with a suitably low noise are desirable.

SUMMARY

The present disclosure relates to optical coherent receivers comprising an optical domain equalizer operable to partially compensate for bandwidth limitations elsewhere in the signal path, either upstream or downstream from the receiver, including but not limited to bandwidth limitations of an electrical signal amplifier upstream from the receiver.

An aspect of the present disclosure provides an optical coherent receiver comprising: first and second back-end optical ports; an optical hybrid (OH) comprising a first input OH port, a second input OH port, a first output OH port, and a second output OH port; and, an optical equalizer network optically interconnecting each of the first and second output OH ports with each of the first and second back-end optical ports.

According to one or more aspects of the present disclosure, the OH may be configured to direct light received in the first input OH port and light received in the second input OH ports into each of the first and second output OH ports with a relative phase shift that increments by 180° from the first output OH ports to the second output OH port.

According to one or more aspects of the present disclosure, the optical equalizer network may be configured so that in operation light received at each of the first and second back-end optical ports from one of the first and second output OH ports is delayed by a time delay τ relative to light received from the other of the first and second output OH ports.

According to one or more aspects of the present disclosure, the optical equalizer network may comprise a first optical delay element disposed in an optical path between the first output OH port and one of the first and second back-end optical ports, and a second optical time delay element disposed in an optical path between the second output OH port and one of the first and second back-end optical ports.

According to one or more aspects of the present disclosure, the receiver may comprise a first optical splitter optically coupled to the first output OH port for splitting light received therefrom between the first and second optical back-end ports, and a second optical splitter optically coupled to the second output OH port for splitting light received therefrom between the first and second optical back-end ports.

According to one or more aspects of the present disclosure, the optical equalizer network may be configured to couple a tunable fraction of light from the first output OH port into the second back-end optical port and to couple a tunable fraction of light from the second output OH port into the first back-end optical port.

According to one or more aspects of the present disclosure, at least one of the first and second optical splitters may comprise a tunable optical coupler.

According to one or more aspects of the present disclosure, the optical equalizer network may comprise at least one tunable optical attenuator disposed in an optical path between one of the first and second output OH ports and one of the first and second back-end optical ports.

According to one or more aspects of the present disclosure, the receiver may include at least one first photodetector (PD) optically coupled to the first back-end optical port and at least one second PD optically coupled to the second back-end optical port.

According to one or more aspects of the present disclosure, the optical coherent receiver may include at least one first photodetector (PD) optically coupled to the first back-end optical port, at least one second PD optically coupled to the second back-end optical port, and a differential amplifier comprising a first input port electrically coupled to the at least one first PD and a second input port electrically coupled to the at least one second PD. In one or more embodiments, the differential amplifier may comprise a trans-impedance amplifier.

According to one or more aspects of the present disclosure, the optical coherent receiver may be configured to receive signal light modulated with a signal at a baud rate R in the first input OH port and for receiving reference light in the second input OH port, wherein the differential amplifier is characterized by an amplifier bandwidth B, and wherein the optical equalizer network is configured so as to boost a high-frequency component of the signal beyond the amplifier bandwidth B. In one or more embodiments, the amplifier bandwidth B may be equal or smaller than R/3. In some embodiments, the amplifier bandwidth B may be in the range from 0.2 R to 0.5 R.

According to one or more aspects of the present disclosure, the optical equalizer network may be configured to couple a tunable fraction of light from the first output OH port into the second back-end optical port and to couple a tunable fraction of light from the second output OH port into the first back-end optical port, and wherein at least one of the relative time delay τ or the tunable fractions are selected so as to boost the high-frequency component of the modulation signal.

According to one or more aspects of the present disclosure, each of the at least one first PD and the at least one second PD may comprise a dual-fed PD disposed to separately receive light from the first output OH port and from the second output OH port.

According to one or more aspects of the present disclosure, each of the first back-end optical port and the second back-end optical port may comprise an optical combiner disposed to combine light from the first and second output OH ports and to couple combined light to the at least one first PD or the at least one second PD.

A further aspect of the present disclosure provides a method for receiving signal light, comprising: coherently mixing received signal light with reference light so as to obtain first light and second light, wherein the first light comprises the signal light and the reference light with a first phase shift therebetween, and the second light comprises the signal light and the reference light with a second phase shift therebetween; coupling a first portion of the first light and a first portion of the second light into at least one first photodetector (PD) and at least one second PD, respectfully; and, coupling a second portion of the first light and a second portion of the second light into the at least one second PD and at least one first PD, respectfully. In at least some embodiments the first phase shift may differ from the second phase shift by 180°.

According to one or more aspects of the present disclosure, the method may further comprise receiving, by the at least one first PD, the second portion of the second light with a time delay τ relative to the first portion of the first light, and receiving, by the at least one second PD, the second portion of the first light with the time delay τ relative to the first portion of the second light. In at least some embodiments the time delay τ may be a fraction η<T of one symbol duration T of the received signal, T=1/R, where R is a signal baud rate.

According to one or more aspects of the present disclosure, the method may comprise sending electrical PD signals from the at least one first PD and the at least one second PD to a differential amplifier.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

Figure 1:
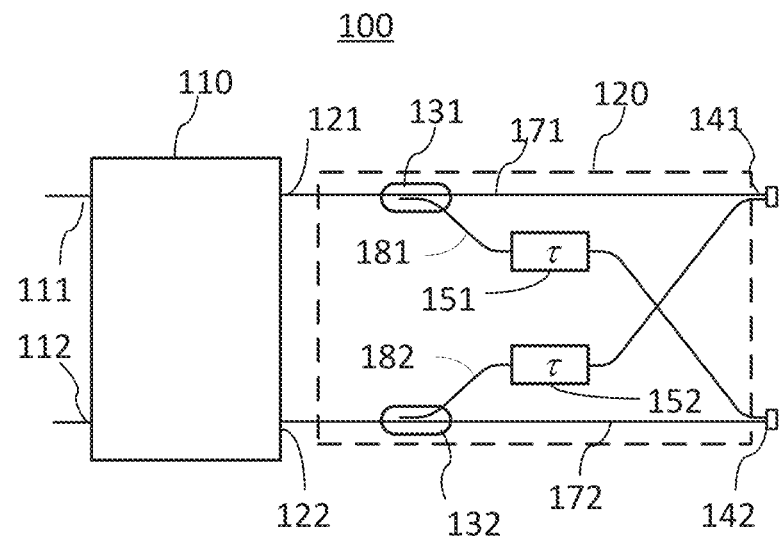
FIG. 1 is a schematic block diagram of an optical front-end of an optical coherent receiver including an optical hybrid followed by an optical equalizer network according to an embodiment.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Furthermore, the following abbreviations and acronyms may be used in the present document:

CMOS Complementary Metal-Oxide-Semiconductor
BiCMOS Bipolar CMOS
GaAs Gallium Arsenide
InP Indium Phosphide
LiNbO3 Lithium Niobate
PIC Photonic Integrated Circuits
SOI Silicon on Insulator
SiP Silicon Photonics
QM Quadrature Modulated
PSK Phase Shift Keying
BPSK Binary Phase Shift Keying
QAM Quadrature Amplitude Modulation
QPSK Quaternary Phase Shift Keying
RF Radio Frequency
OSNR Optical Signal to Noise Ratio
ROSNR Receiver Optical Signal to Noise Ratio
BER Bit Error Rate
MMI Multi Mode Interference Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. Radio frequency (RF) may refer to any frequency in the range from kilohertz (kHz) to hundreds of gigahertz (GHz). The term optical hybrid (OH) refers to a device that is configured to coherently mix two light signals and to output two or more mixed optical signals in which the input optical signals are combined with different optical phase shifts therebetween. When these optical shifts are incremented by 90 degrees, or $\pi/2$ rad, from one output port of the optical hybrid to another, the optical hybrid may be referred to as a 90 degree optical hybrid (90° OH). When these optical shifts are incremented by 180 degrees, or $\pi$ radian (rad), from one output port to another, the optical hybrid may be referred to as a 180 degree optical hybrid (180° OH). A 180° OH may be embodied as a 90° OH with three or more output ports, so long as it includes two output ports for which the phase shifts between the input light signals differ by 180°. The term receiver sensitivity refers to a minimum strength of the received optical signal that guarantee an acceptable level of the receiver's performance. The terms "connected", "coupled", and their variants are intended to encompass both direct connections and indirect connection through one or more intermediate elements, unless specifically stated otherwise.

One or more aspects of the present disclosure relates to an optical coherent receiver that includes an optical-domain equalizer (ODE) operationally following an optical hybrid (OH). In one or more embodiments an ODE may be configured to adjust for signal imperfections in the transmission path of the optical signal. In one or more embodiments an ODE may be configured to pre-compensate for imperfections and/or limitations in the electrical circuitry of the optical receiver and/or circuitry following the optical receiver. In one or more embodiments an ODE may be configured to reduce effects of noise on the performance of the optical receiver. In one or more embodiments an ODE may be configured to effectively increase the bandwidth of the optical receiver for a given receiver sensitivity.

With reference to FIG. 1, there is schematically illustrated an optical front-end of a coherent optical receiver 100, which may also be referred herein simply as receiver 100, according to one or more embodiments. As illustrated, receiver 100 includes an optical mixer 110 operatively followed by an optical-domain equalizer (ODE) 120. The optical mixer 110 may be in the form of a 180° OH with two input OH ports 111, 112 and two output OH ports 121, 122. Receiver 100 has two back-end optical ports, a first back-end optical port 141 and a second back-end optical port 142. The ODE 120 interconnects the output OH ports 121, 122 with the back-end optical ports 141, 142 of the receiver so that light from each of the two output OH ports 121, 122 is coupled into each of the back-end optical ports 141, 142. ODE 120 and variants thereof such as those described below may also be referred to herein as the optical equalizer network. The optical connection 171 between a first output OH port 121 and the first back-end optical port 141, and the optical connection 172 between a second output OH port 122 and the second back-end optical port 142, may be referred to herein as the direct connections 171, 172 or the direct paths 171, 172. Light propagating along the direct paths 171, 172 may be referred to as the direct propagating light or simply as the direct light. The optical connection 181 between the first output OH port 121 and the second back-end optical port 142, and the optical connection 182 between the second output OH ports 122 and the first back-end optical port 141, may be referred to herein as the cross-coupling connections or cross-coupling paths. In at least some embodiments the direct 171, 172 and the cross-coupling 181, 182 paths may be implemented with optical waveguides. Light propagating along the cross-coupling paths 181, 182 may be referred to as the cross-coupled light. ODE 120 may include two optical splitters or taps 131, 132, which may be disposed at or following the first and second output OH ports 121, 122, respectively, to split light from each of the output OH ports 121, 122 into the direct propagating light and the cross-coupled light, which are then guided towards corresponding back-end optical ports 141 and 142. Optical splitters or taps 131, 132 may be embodied, for example, as directional optical couplers, MMI couplers, or generally as any suitable optical device that is operable to split light between two optical paths in a desired proportion. Each of the back-end optical ports 141, 142, which are illustrated in FIG. 1 schematically, may be embodied for example as one or more edge couplers configured for optical coupling to one or more PDs, as one or more grating couplers configured for optical coupling to one or more PDs, or simply as the end or ends of one or more optical waveguides configured to receive light from the direct and cross-coupled paths 171 and 182, or 172 and 181.

Figure 13:
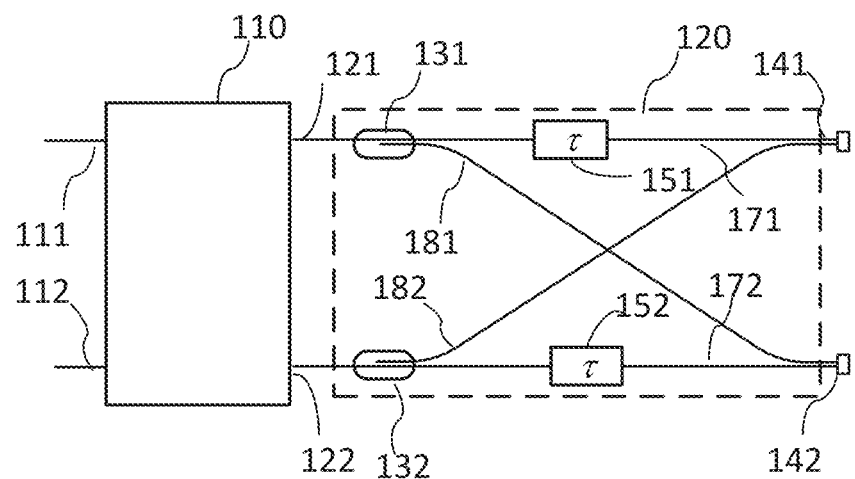
FIG. 13 is a schematic diagram of an embodiment of the optical receiver of FIG. 1 with variable optical delays in the direct optical paths from output ports of the optical hybrid to respective photodetectors.

ODE 120 may be configured so that light from the first and second OH output ports 121, 122 reach each of the first and second back-end optical ports 141, 142 with a relative time delay $\tau$ between the direct and cross-coupled light. In the illustrated embodiment ODE 120 includes two optical delay elements or devices 151 and 152 disposed in the cross-coupling paths 181, 182 of the ODE. In one or more other embodiments the optical delay elements 151, 152 may be disposed in the direct paths 171, 172 of ODE 120, as illustrated in FIG. 13. Embodiments where one of the time delays 151, 152 is disposed in a direct path 171 or 172 and the other in one of the cross-coupling paths 182 or 181, are also within the scope of the present disclosure. In one or more embodiments the optical delay elements 151, 152 may be, for example, in the form of a length of an optical waveguide. In one or more embodiments the optical delay elements 151, 152 may be tunable or switchable, i.e. configured to vary the effective time delay τ they provide in dependence on a control signal. In one or more embodiments the optical lengths of the cross-coupling paths 181, 182 exceeds that of the direct paths 171, 172, accounting for the delay elements 151, 152, so as to result in a desired relative time delay τ for the cross-coupled light relative to the direct-propagating light. In one or more embodiments this time delay may be a fraction η<1 of a symbol period T=1/R of signal light being received, where R is the baud rate of the received signal, although values of τ=0 or somewhat greater than T are not excluded. In some embodiments the relative time delay τ may be for example in the range of 0.1 T to 0.9 T. In some embodiments an optimal value of the time delay τ may be in a narrower range, for example from 0.2 T to 0.6 T. Embodiments may be envisioned in which the optical delays 151, 152 are absent as distinct elements, and the direct and cross-coupling connections 171, 172, 181, 182 of ODE 120 are embodied with waveguides that have lengths providing the desired relative delays between the cross-coupled and direct-coupled light. Although the direct optical connections 171, 172 are schematically shown with straight lines in FIG. 1 and various other drawings described hereinbelow, in actual implementations optical waveguides embodying these direct connections may be routed along curved paths.

Figure 2:
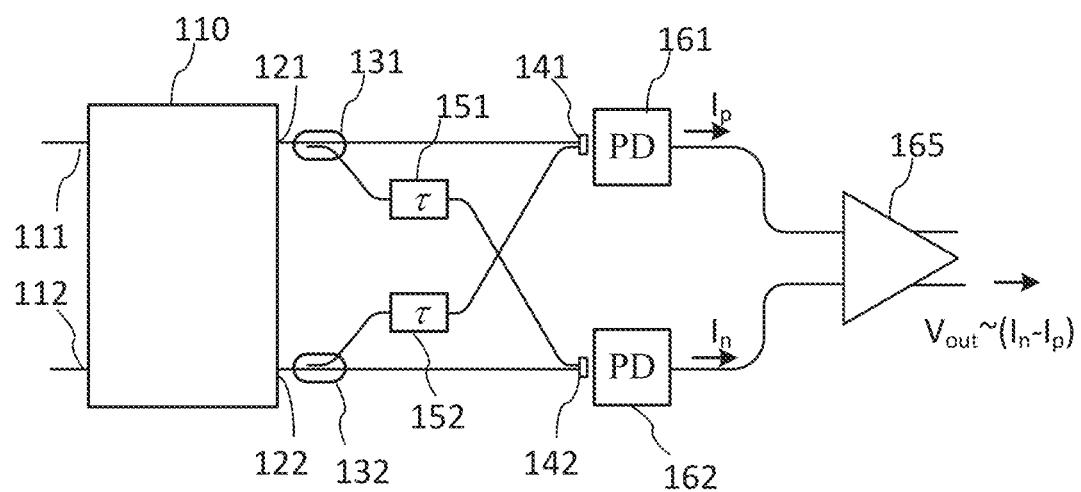
FIG. 2 is a schematic block diagram of an optical coherent receiver including an optical equalizer network followed by two or more photodetectors and an electrical amplifier.

With reference to FIG. 2, in one or more embodiments the optical receiver 100 may further include two or more photodetectors (PD) that may comprise a first PD 161 optically coupled to the first back-end optical port 141 and a second PD 162 optically coupled to the second back-end optical port 142. Electrical outputs of the first and second PDs 161, 162, referred to herein as the first output PD signal $I_p$ and the second output PD signal $I_n$ respectively, may be coupled to input ports of an electrical signal amplifier 165 having a bandwidth $B_{amp}$. The electrical signal amplifier 165 may be a differential amplifier which output is proportional to a difference between signals at its input ports. In a representative embodiment the electrical signal amplifier 165 is a trans-impedance amplifier (TIA), and may be referred to herein as TIA 165.

In accordance with an embodiment, in operation one of the input OH ports 111 or 112 may receive signal light that is modulated with a broadband signal, while the other may receive reference light from a local oscillator (LO) optical source, referred to herein as the LO light. The signal light and the LO light may be represented by a signal light field $E_{sig}(t)$ and the LO light field $E_{lo}$, respectively. The signal light field $E_{sig}(t)$ and the LO light field $E_{lo}$ may represent complex amplitudes of the respective optical fields accounting for the broadband modulation signal of the signal light and a possible shift between the optical carrier frequency of the signal light and the optical frequency of the LO light, when present. At the output OH ports 121, 122 the signal and LO lights may be coherently combined with a relative phase shift therebetween that differ by 180°, or π rad.

Figure 3B:
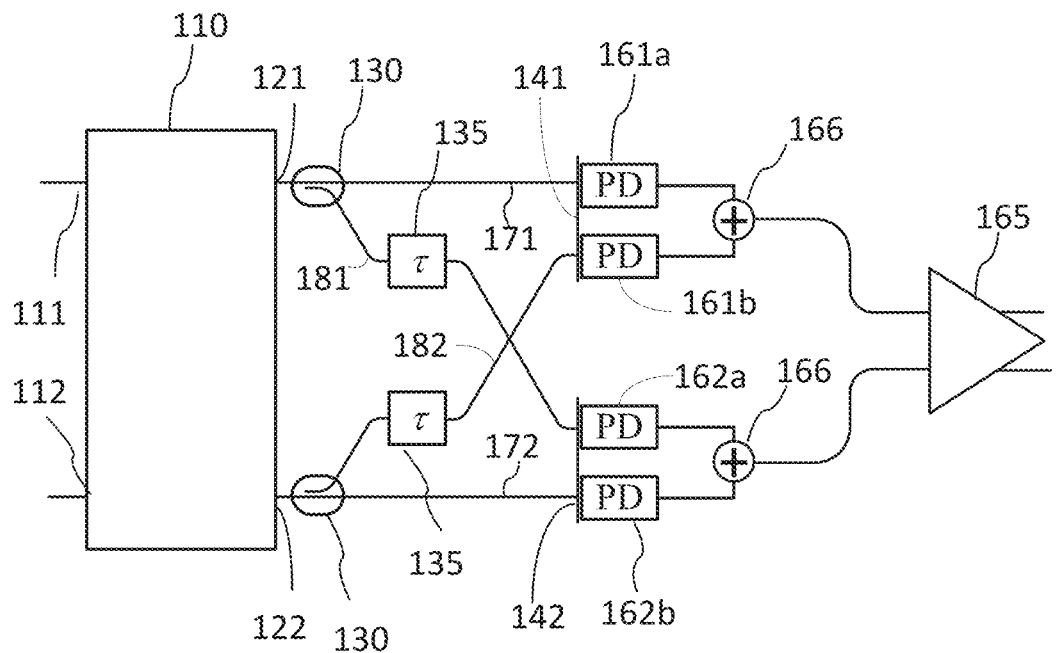
FIG. 3B is an embodiment of the optical coherent receiver of FIG. 2 with two photodetector pairs for non-coherent summing of optical signals from two output ports of an optical hybrid.
Figure 3A:
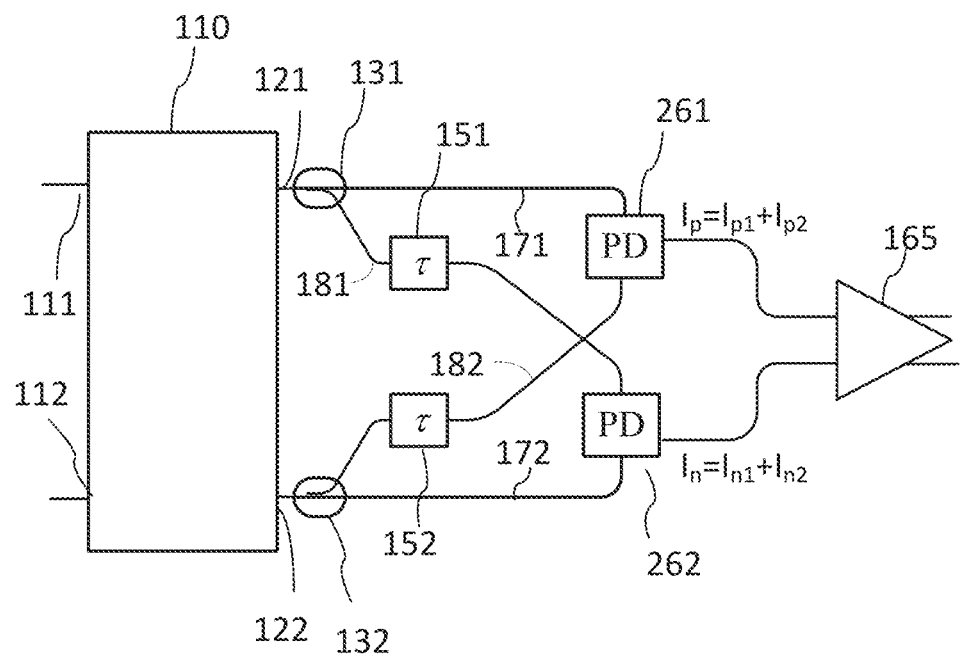
FIG. 3A is a schematic block diagram of an embodiment of the optical coherent receiver of FIG. 2 with two dual-fed photodetectors for non-coherent summing of optical signals from two output ports of an optical hybrid.

Referring to FIG. 3A, there is illustrated a variation of the optical receiver of FIG. 2 in which the first PD 161 is embodied as a first dual-fed PD 261 and the second PD 162 is embodied as a second dual-fed PD 262. The first dual-fed PD 261 is disposed to receive light from the direct path 171 and the cross-coupling path 182 and to separately convert them into electrical PD signals $I_{p1}$ and $I_{p2}$, with the total electrical PD signal from the first dual-fed PD 261 $I_p=(I_{p1}+I_{p2})$. The second dual-fed PD 262 is disposed to receive light from the direct path 172 and the cross-coupling path 181 and convert them separately into electrical PD signals $I_{n1}$ and $I_{n2}$, with the total electrical PD signal from the second dual-fed PD 262 $I_n=(I_{n1}+I_{n2})$. Each of the back-end optical ports 141, 142 which are schematically illustrated in FIGS. 1 and 2, may be embodied for example as two edge couplers configured for optical coupling to photo-sensitive areas of a corresponding PD 261, 262, as two grating couplers configured for optical coupling to two photo-sensitive areas of a corresponding PD 261, 262, or simply as the ends of two optical waveguides implementing the direct and cross-coupled paths 171, 182 or 172, 181. Note that although PDs 261 and 262 are shown to receive the direct light and cross-coupled light from opposite sides, it is not a requirement. Furthermore, in some embodiments the direct and cross-coupled light at least partially overlap at a photosensitive area of the dual-fed PD 261 or 262.

In the embodiment of FIG. 3A, the output PD signals $I_p$, $I_n$ may be mathematically represented with the following equations:

$$I_p(t) \sim \kappa^2 |(E_{sig}(t)+E_{lo})|^2 + \sigma^2 |(E_{sig}(t-\tau)-E_{lo})|^2 \quad (1)$$

$$I_n(t) \sim \kappa^2 |(E_{sig}(t)-E_{lo})|^2 + \sigma^2 |(E_{sig}(t-\tau)+E_{lo})|^2 \quad (2)$$

where $\sigma^2$ and $\kappa^2$ are the cross-coupling and direct-coupling coefficients, respectively of optical splitters 131 and 132, that may be generally referred to as the coupling coefficients and that satisfy equation (3):

$$\kappa^2 + \sigma^2 = 1 \quad (3)$$

By way of example, for a lossless optical coupler that taps off 10% of input optical power via a tap port while letting 90% passes through the coupling coefficients are $\sigma^2=0.1$, $\kappa^2=0.9$. Generally the coupling coefficients of the two optical splitters 131, 132 may differ, and may be controlled independent in some embodiments, but are assumed to be approximately equal here in order not to obscure the description.

Referring to FIG. 3B, there is illustrated a variant of the embodiment of FIG. 3A wherein the dual-fed PDs 261, 262 are replaced with two pairs of distinct PDs 161a, 162b and 162a, 162b, each PD pair followed by an electrical summing circuit or element 166. This embodiment is functionally equivalent to the embodiment of FIG. 3A, and the electrical signals at the TIA inputs may again be represented by equations (1) and (2).

Figure 3C:
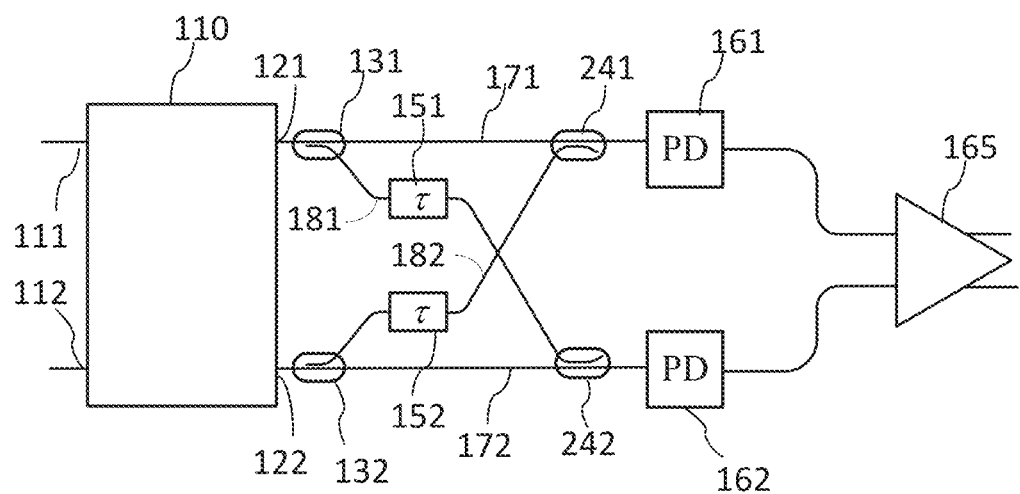
FIG. 3C is a schematic block diagram of an embodiment of the optical coherent receiver of FIG. 2 with two output optical couplers for coherent mixing of optical signals from two output ports of an optical hybrid.

With reference to FIG. 3C, in one or more embodiments the direct and cross-coupled light from the two output OH ports 121, 122 may be coherently combined at each of the back-end optical ports 141 and 142 prior to be coupled into one of the PDs 161, 162. Such embodiments may include output optical couplers 241 and 242, each disposed to combine direct light from one of the two OH output ports with the delayed light from the other of the two OH output ports. In such embodiments, the output PD signals $I_p$ and $I_n$ may be mathematically represented with the following equations:

$$I_p(t) \sim |\kappa^2(E_{sig}(t)+E_{lo})-\sigma^2(E_{sig}(t-\tau)-E_{lo})|^2 \quad (4)$$

$$I_n(t) \sim |\kappa^2(E_{sig}(t)-E_{lo})-\sigma^2(E_{sig}(t-\tau)+E_{lo})|^2 \quad (5)$$

Embodiments illustrated in FIGS. 3A-3C share a number of features and/or elements with embodiments illustrated in FIGS. 1 and 2; such elements and/or features are indicated in all these figures with like reference numerals, and the descriptions provided hereinabove with reference to FIGS. 1 and 2 in relation thereto are applicable to the embodiments of FIGS. 3A-3C.

In various embodiments ODE 120 may be configured to improve the performance of the optical receiver in a communication system, and/or allow to relax some system requirement. An optical receiver may be characterized by the receiver sensitivity, i.e. a minimum power of the input signal that may be required for obtaining an acceptable receiver performance, and the degree of signal degradation that may occur in the receiver. The receiver sensitivity is limited by noise generated in the electrical circuitry of the receiver within its bandwidths. Noise generated by a device performing an operation on a signal is proportional to its bandwidth. The noise performance of the early stages in the receiver, when the signal is still weak, may dominate the noise performance of the entire chain. Therefore, reducing the bandwidth of a device or component at an early stage of the electrical circuit of the receiver may generally improve the noise performance of the receiver. For optical receivers of the type illustrated in FIG. 2 or its variants in FIGS. 3A-3C, reducing the bandwidth $B_{amp}$ of TIA 165 would generally tend to improve the receiver sensitivity. However, reducing the TIA bandwidth $B_{amp}$ too far below the baud rate R of the communication signal carried by the received signal light, or generally too far below the spectral width of the signal light modulation, may corrupt the signal at the output of the receiver resulting in a higher bit error rates (BER).

Advantageously, ODE 120 may be configured so as to provide a high-frequency pre-emphasis to the communication signal in optical domain at frequencies near the baud rate R, that serves to effectively extend the spectral width of the electrical signal at the output of TIA 165 somewhat beyond the TIA bandwidth $B_{amp}$. The effect of ODE 120 may be understood by noting that it may operate substantially as a single-tap pre-emphasis filter implemented in optical domain.

Indeed, in embodiments wherein TIA 165 is configured as a differential amplifier, it outputs an electrical signal $V_{out}$ that is proportional to a difference between the PD signals at its inputs $I_n$ and $I_p$:

$$V_{out}=a[I_p(t)-I_n(t)] \quad (6)$$

where a is a TIA gain coefficient. Considering by way of example embodiments of ODE 120 such as those illustrated in FIGS. 3A and 3B, equation (6) may be transformed to the following equation (7) taking into account equations (1) and (2):

$$V_{out}=4a\kappa^2[S(t)-h^2 S(t-\tau)] \quad (7)$$

where $h=\sigma/\kappa$ and $$S(t)=Re\{E_{sig} \cdot E^*_{lo}\} \quad (8)$$

Thus, the electrical signal at the output of TIA 165 may be in the form of an output of a single-tap pre-emphasis FIR filter with a tap coefficient h and the time delay τ, as defined by the relative strength of the optical cross-coupling and the associated optical delays in ODE 120. By suitably selecting their values, with τ being typically a fraction of a baud period T=1/R, ODE 120 may function to effectively broaden the receiver bandwidth beyond $B_{amp}$.

Figure 4:
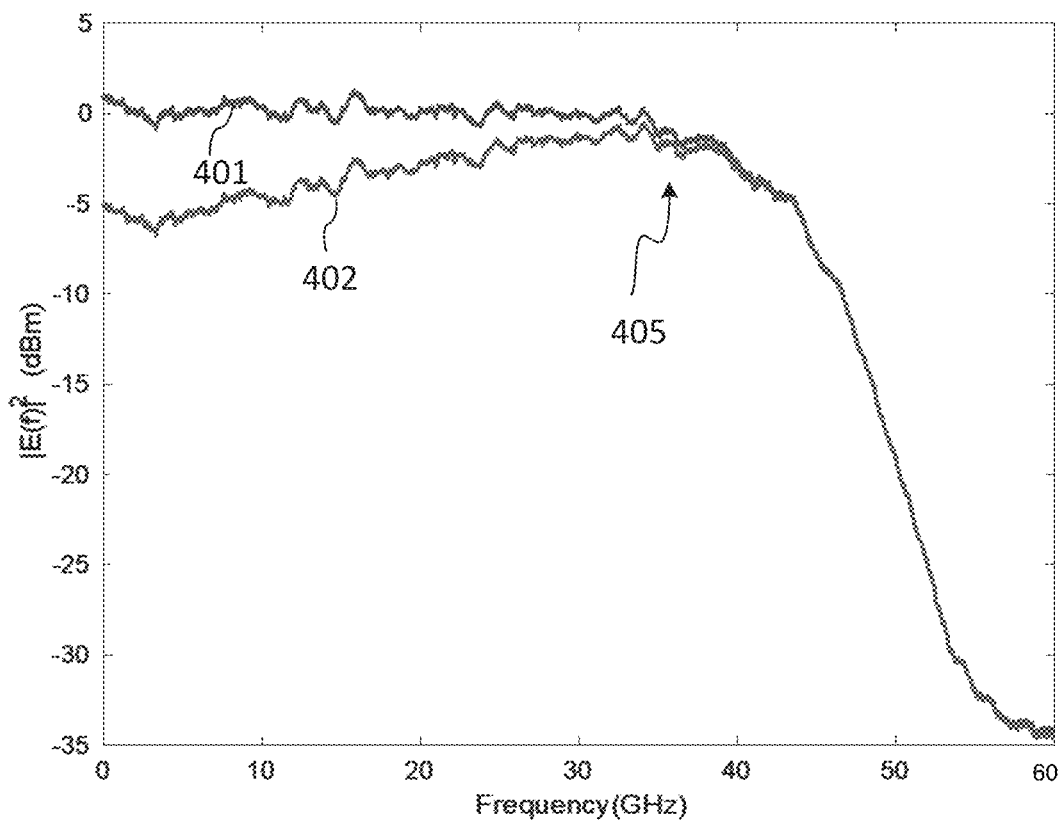
FIG. 4 is a graph illustrating simulation results for the spectrum of an electrical signal at the output of the differential amplifier of the optical receiver of FIG. 2 with optical domain equalization (cross-coupling coefficient $h^2=0.25$, curve 402) and without optical domain equalization ($h^2=0$, curve 401), assuming an infinite amplifier bandwidth, for an example embodiment; the high-frequency pre-emphasis due to the optical domain equalization is indicated at 405.
Figure 5:
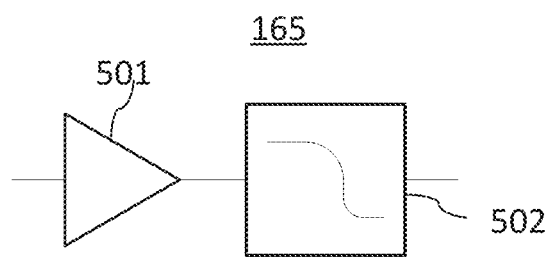
FIG. 5 is a schematic block diagram representing a differential amplifier as an ideal amplifier followed by a low-pass filter.
Figure 6:
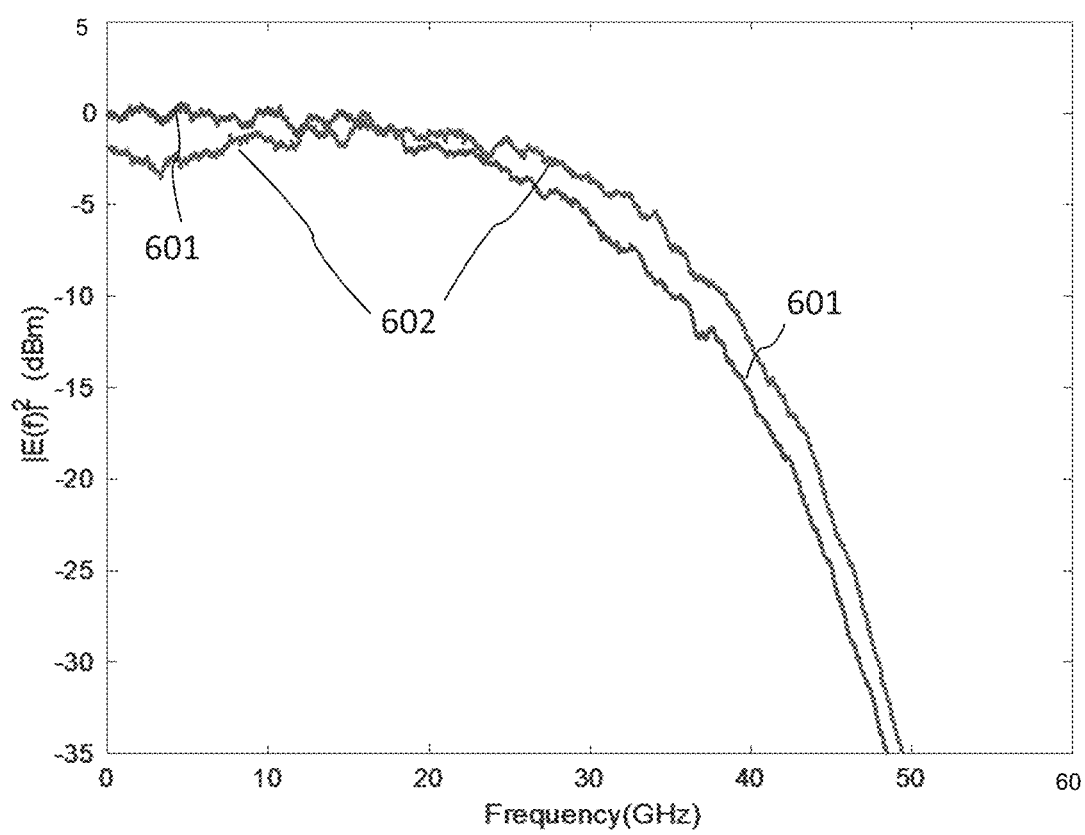
FIG. 6 is a graph illustrating simulation results for the spectrum of an electrical signal at the output of the differential amplifier of the optical receiver of FIG. 2 having a finite bandwidth of 38 GHz with the optical domain equalization ($h^2=0.25$, curve 602) and without the optical domain equalization ($h^2=0$, curve 601)

FIGS. 4-7 show simulation results illustrating the operation of the optical receiver 100 with optical domain equalization described hereinabove for one or more embodiments. With reference to FIGS. 4 and 6, a model of TIA 165 is considered that presents the TIA 165 as an ideal TIA 501 of infinite bandwidth that is followed by a low pass filter 502 with bandwidth $B_{amp}$, as illustrated in FIG. 5. The simulations were performed for an optical signal carrying 90 Gbaud 64QAM modulation with 0.1 Nyquist rolloff, generated using a DAC and an MZM with 50 GHz bandwidth each. At the receiver PDs with 38 GHz bandwidth, and an ADC with 50 GHz bandwidth after the TIA are assumed. Trace 401 in FIG. 4 shows electrical signal spectrum at the output of the ideal TIA block 501, i.e. prior to the LP TIA filter 502, in the case of a conventional receiver with the cross-coupling coefficient $h^2=0$. Trace 402 in FIG. 4 shows simulated electrical signal spectrum at the output of the ideal TIA 501 for the same receiver but with ODE 120 with $h^2=0.25$ and τ=10 ps. A high-frequency pre-emphasis for the ODE-effected signal is indicated at 405. The spectrum of the electrical signal after the LP TIA filter 502 is illustrated in FIG. 6 by trace 601 for the conventional receiver with the cross-coupling coefficient $h^2=0$, and with the ODE-effected high-frequency pre-emphasis by trace 602. The ODE-effected broadening of the electrical signal spectrum at the output of TIA 165 is clearly visible.

Figure 7:
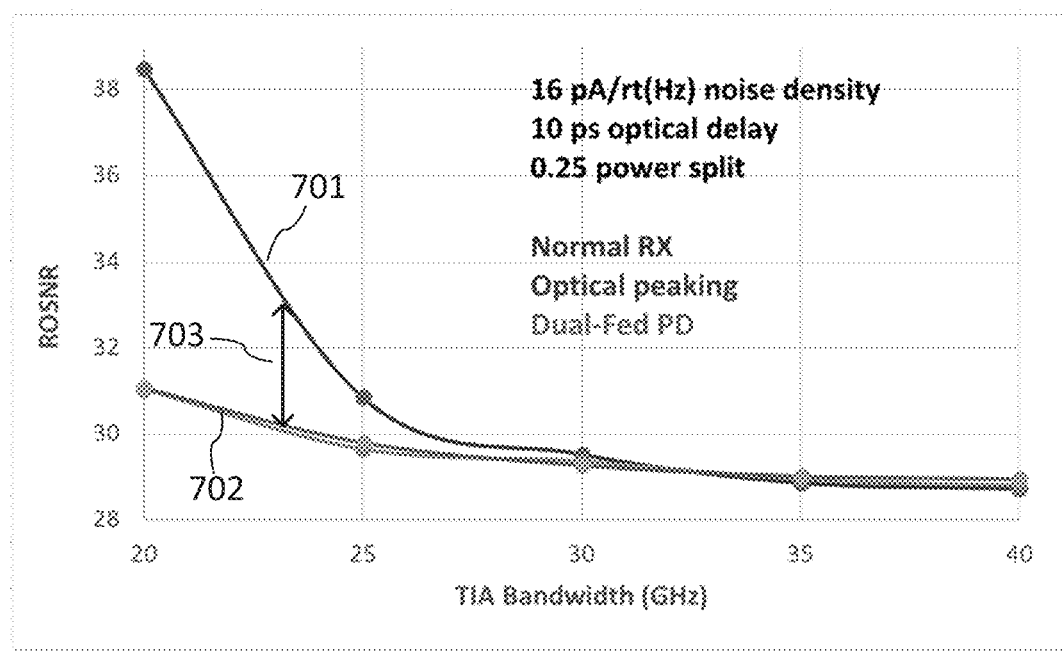
FIG. 7 is a graph illustrating the dependence of the receiver sensitivity, represented as the receiver OSNR (ROSNR) required to achieve a specific BER ($3.8 \cdot 10^{-2}$), upon the amplifier bandwidth for the receiver with (702) and without (701) the optical equalizer for a first receiver noise level (16 pA/√Hz) according to the simulations of the example embodiment; the ROSNR threshold is the ROSNR required to achieve a specific BER ($3.8 \cdot 10^{-2}$)

FIG. 7 shows the receiver sensitivity as a function of the TIA bandwidth for an example TIA noise level of 16 pA/√Hz, according to the simulations. Here the receiver sensitivity is expressed in terms of the optical signal to noise ratio (ROSNR) that is required to reach BER of $3.8 \cdot 10^{-2}$, termed "OSNR threshold". Curve 701 shows the OSNR threshold for the conventional receiver ($h^2=0$), while curves 702 show the ROSNR threshold for the optical receiver with the optical domain pre-compensation, as described hereinabove. Simulations for both dual-fed and optical signal summing in the pre-compensator, as described hereinabove with reference to FIGS. 3A and 3C respectfully, yield similar results, and are shown at 702. Improvement in the threshold ROSNR due to the optical-domain pre-compensation is clearly visible for $B_{amp}$ below 30 GHz, or about ⅓ of the baud rate R. Note that the simulation results shown in FIGS. 4, 6, and 7 are by way of example and for illustrative purposes only. In various receiver embodiments employing ODE 120 or variants thereof to pre-compensate for a limited amplifier bandwidth, the amplifier bandwidth $B_{amp}$ may be in a range from about 0.2 R to 0.5 R. Smaller values of the $B_{amp}/R$ ratio may also be possible in some receiver embodiments employing ODE 120, depending on the receiver OSNR penalty budget. Embodiments in which $B_{amp}$ is greater than 0.5 R may also be envisioned.

Thus, ODE 120 allows to partially pre-compensate for a low TIA bandwidth $B_{amp}$, thereby enabling an improvement in the receiver sensitivity for a target BER at the output of the receiver, compared to a conventional coherent optical receiver operating at the same baud rate R. Here, "conventional coherent optical receiver", also referred to simply as the "conventional receiver", is understood as an optical receiver that is similar to the receiver 100 of FIG. 2 except it lacks the cross-coupling paths 181, 182 between the output OH ports 121, 122 and the back-end optical ports 142, 141, or $h^2=0$, so that each output OH port 121, 122 is coupled to only one of the first and second PDs 161, 162 in FIG. 2. By suitably selecting the time delays τ provided by the delay elements 151, 152, and the fractions of light directed to each back-end optical port by the optical splitters 131 and 132, ODE 120 may pre-compensate for the signal degradation due to the limited TIA bandwidth $B_{amp}$. This may enable increasing the signal rate R at which the receiver 100 with TIA 165 of a given bandwidth may operate. It may also enable improving the receiver sensitivity by using a TIA with a smaller bandwidth $B_{amp}$ than a conventional receiver would require to achieve a target BER for a given input signal rate R.

Figure 8:
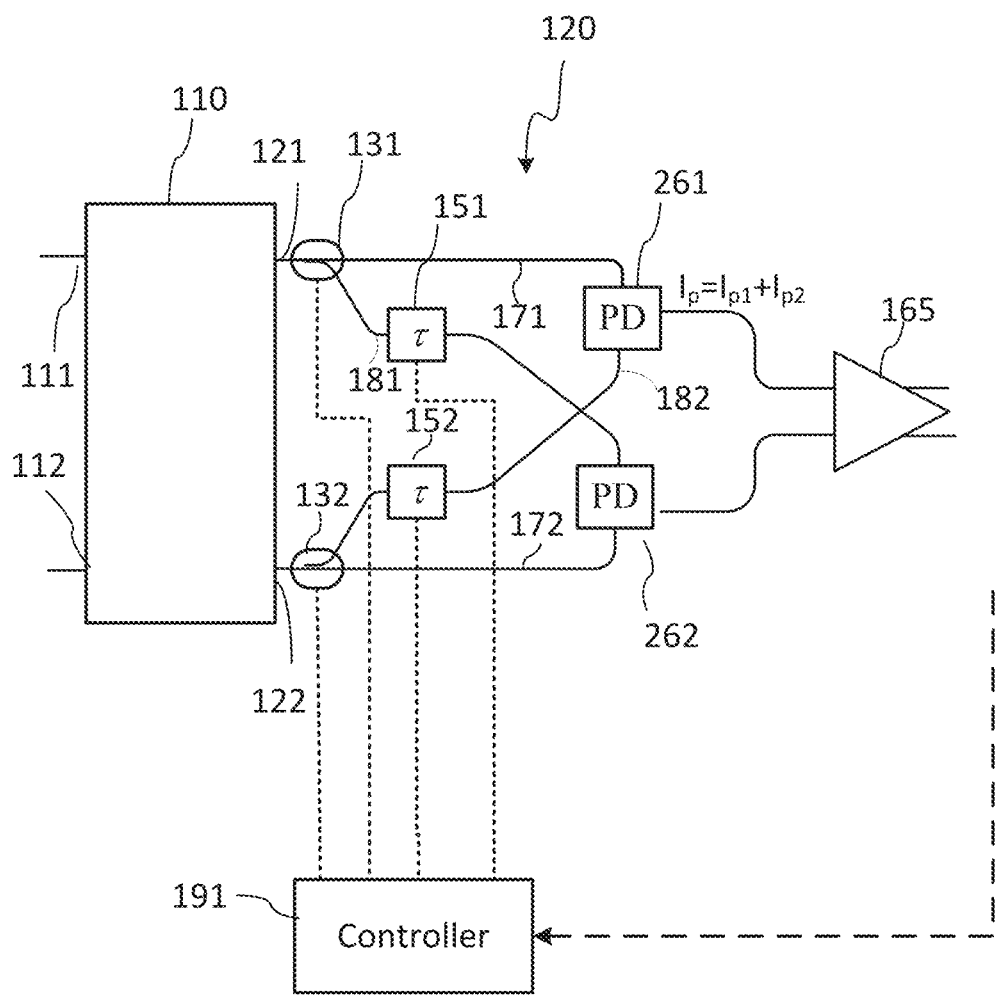
FIG. 8 is a schematic block diagram of an embodiment of the optical receiver of FIG. 2 with a controller coupled to the optical equalizer for adjusting optical delays and/or the amount of cross-coupling.

With reference to FIG. 8, in some embodiment one or both of the ODE parameters τ, $h^2$ may be tunable using a controller 191. FIG. 8 schematically shows an example embodiment of the optical receiver 100 with two dual-fed PDs 261, 262 as generally illustrated in FIG. 3A, with the controller 191 that is configured to tune at least one of the time delays elements 151, 152 and/or at least one of the coupling coefficients $h^2$ of the optical splitters 131, 132. In this and similar embodiments optical couplers or taps 131, 132 may be configured, for example, as tunable directional couplers incorporating electrically controller heaters to adjust their coupling ration; in other embodiments, splitters 131, 135 may be configured to be tuned using an electro-optic or a magnet-optic effect. Couplers tunable by mechanical stress may also be envisioned, as well as embodiments in which tuning of the cross-coupling coefficients is performed using variable optical attenuators (VOAs), optical path switches, or voltage-controller MZI couplers. In one or more embodiments optical time delays 151, 152 may also be in the form of electrically tunable time delays, or electrically tunable phase shifters. The optical time delays 151, 152 may also be embodied as switchable-path delay circuits, which are operable to switchably direct light from an input to an output along one of a plurality of optical paths, e.g. waveguides, of different lengths, for example using waveguide coupler switches. In other embodiments the direct optical paths 171, 172 and the cross-coupling optical paths 181, 182 may be embodied with optical waveguides that are routed so as to provide the desired relative time delay τ for the cross-coupled light. In some embodiments controller 191 may receive feedback from an element downstream from TIA 165 and may be configured to adjust one or more of the ODE parameters, such as the delay τ and/or the tap coefficient $h^2$, in response from a received feedback signal.

Figure 9:
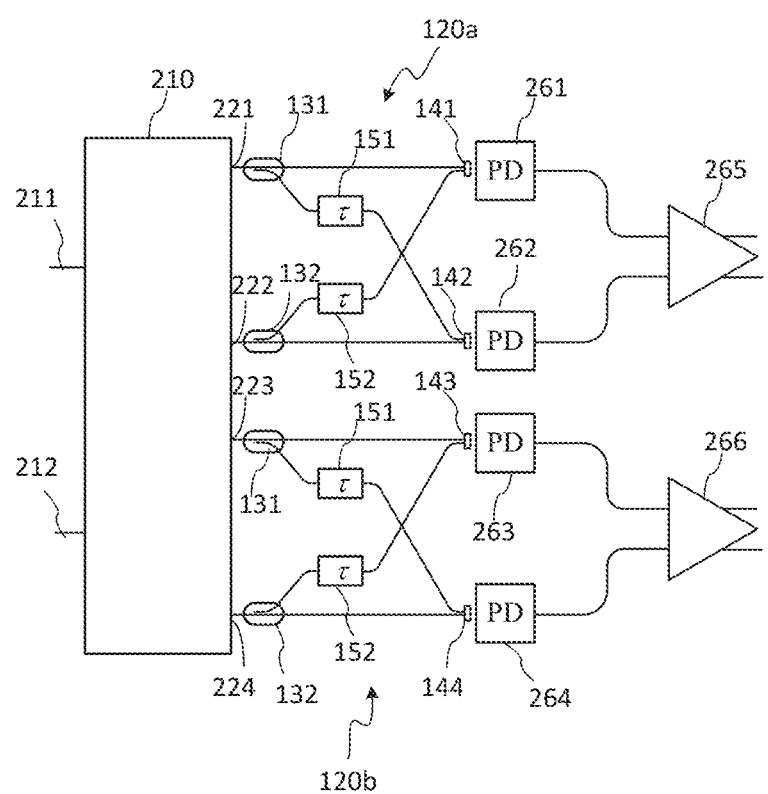
FIG. 9 is a schematic diagram of an optical QM receiver with a dual-channel optical equalizer for separately equalizing in-phase and quadrature signals.

With reference to FIG. 9, there is illustrated an embodiment of an optical receiver that is configured for receiving quadrature modulated (QM) optical signals, such as for example optical signals modulated using a QPSK or a QAM format. Such a receiver may include, substantially, two copies of the receiver circuit of FIG. 2 that are configured for extracting in-phase (I) and quadrature-phase (Q) modulation components of the received QM signal, and among other components may include two copies of ODM 120 in the form of ODM 120a and ODM 120b. Accordingly in this embodiment the receiver includes four back-end optical ports 141-144 to which four or more PDs 161-164 are pairwise optically coupled, with pair of PDs 261, 262 and 263, 264 connecting to differential amplifiers 265 and 266, respectively. The OH 110 of the receiver of FIG. 2 is embodied here in the form of a 90° optical hybrid 210 having two input OH ports 211, 212 and four output OH ports 221-224. When one of the two input OH ports receives signal light and the other LO light, each of the output OH ports outputs mixed light combining the signal and LO light. The phase shift between the signal and LO light increments by substantially 180 degrees between the first and second output OH ports 221, 222 and also between the third and fourth output OH ports 223, 224, and increments by +\−90° between the second and third output OH ports 222, 223. Light from the first OH output port 221 and the second OH output port 222 is directed to the first and second back-end optical ports 141, 142 via the first ODE 120a and then coupled into each of the first and second PDs 261, 262, while light from the third OH output port 223 and the fourth OH output port 224 is directed to the third and fourth back-end optical ports 143, 144 via the second ODE 120b, and coupled into each of the third and fourth PDs 263, 264. In some embodiments the back-end optical ports 141-144 may be in the form, or include, an optical coupler for optically combining direct-propagating light and cross-coupled light prior to coupling to a respective PD 161, 162, 163, or 164, generally as described hereinabove with reference to FIG. 3C. In other embodiment each of the PDs 161-164 may be a dual-fed PD, generally as described hereinabove with reference to FIG. 3A. In other embodiments each of the four PDs 161-164 may be in the form of a PD pair as described hereinabove with reference to FIG. 3B. It will be appreciated that a combination of these variants would also be possible. Each of the first and second ODEs 120a, 120b includes two optical splitters or taps 131, 132, and may also include two delay lines 151, 152, and may operate generally as described hereinabove with reference to FIGS. 1-8 to provide an effective high-frequency pre-emphasis and to broaden signal spectrum for I and Q signals at the output of the differential amplifiers 265, 266.

Figure 10:
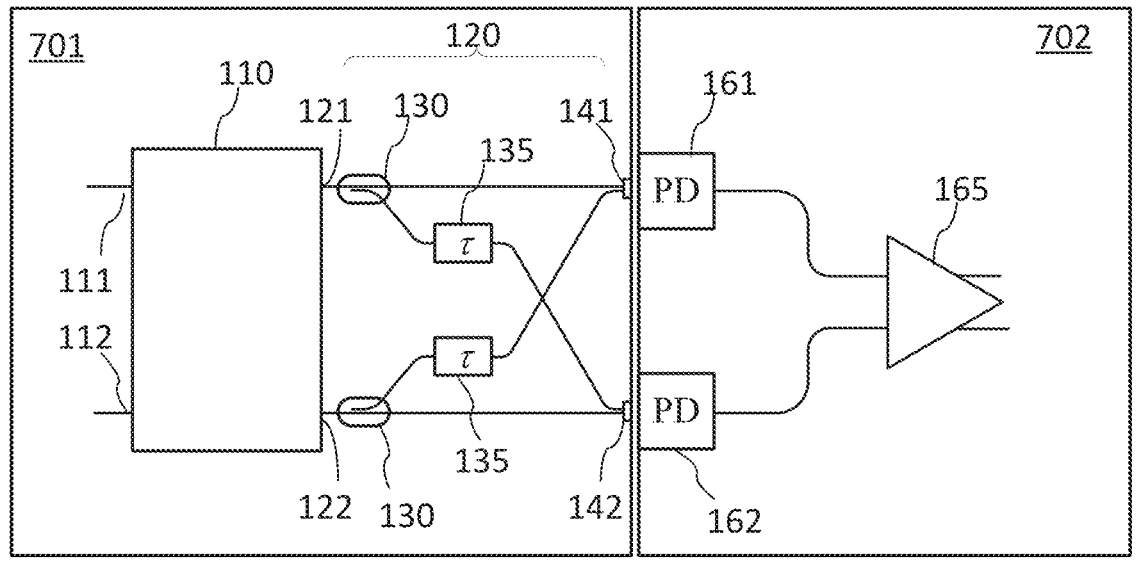
FIG. 10 is a schematic diagram illustrating an optical chip implementation of the optical receiver of FIG. 2, with photodetectors in an electrical circuitry chip.
Figure 11:
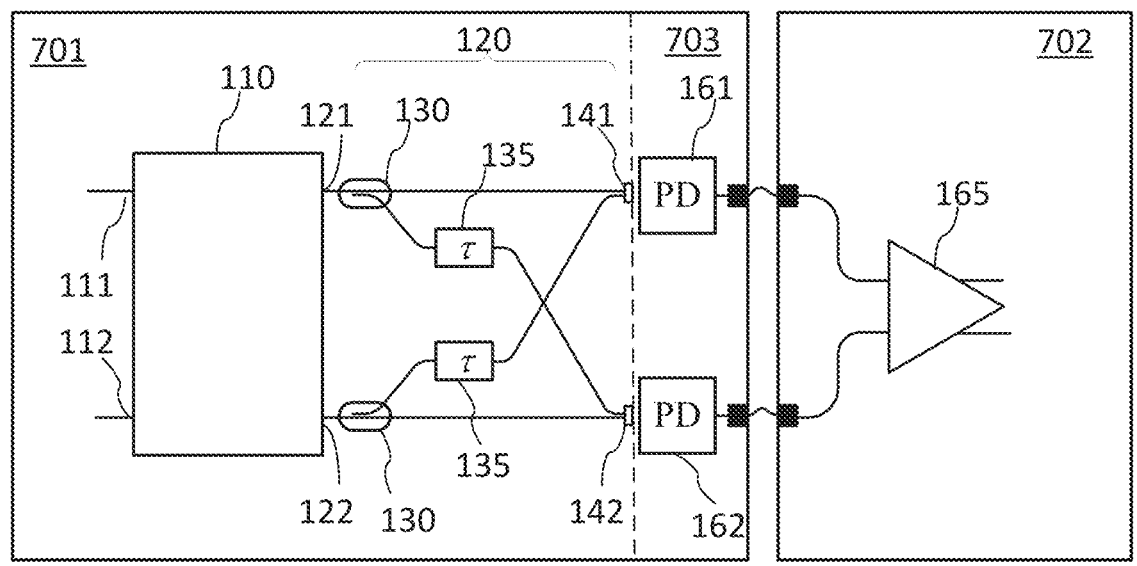
FIG. 11 is a schematic diagram illustrating an optical chip implementation of the optical receiver of FIG. 2, with photodetectors in the optical chip and an amplifier in an electrical circuitry chip.

With reference to FIGS. 10 and 11, the optical receivers with optical domain equalization of the type described hereinabove may be implemented as an integrated photonic circuit including one or more chips. FIG. 10 illustrates an example embodiment wherein the optical front-end of the receiver, for example as illustrated in FIG. 1, is implemented in a photonic chip 701, which includes the OH 110 and ODE 120. OH 120 may be implemented, for example, as a 2×4 MMI coupler, or as a network of 2×2 and 1×2 waveguide couplers. In ODE 120, the direct and cross-coupling connections may be implemented as planar optical waveguides of suitable length. Photonic chip 701 may be, for example, a silicon chip, such as a SOI chip. It may be optically coupled to an opto-electronic chip 702 which may support PDs 161, 162 and may include the differential amplifier 165 and electrical paths connecting them. The opto-electronic chip 702 may also include other electrical circuitry as known in the art of QM receivers. The opto-electronic chip 702 may be embodied, for example, using CMOS technology.

FIG. 11 illustrates a variation of the example embodiment of FIG. 10 wherein the PDs 161, 162 are implemented in, or supported by, the photonic chip 120, that connects electrically to the second chip 702 comprising substantially only electronic circuitry including the differential amplifier 165. PDs 161, 162 may be embodied as dual-fed PDs receiving light separately from the direct and cross-coupling paths, or as a more conventional single-fed PDs. In some embodiments optical ports 141, 142 may be in the form, or include, optical combiners as described hereinabove. A three-chip embodiment may also be possible, in which the PDs 161, 162 may be on an intermediate chip 703 that is optically coupled to the photonic chip 702 at one side, indicated by a dashed line in the figure, and electrically coupled to the electronic chip 702.

It will be appreciated that both the photonic chip 701 and the electronic chip 702 may include other elements not shown in FIGS. 10 and 11. For example, the photonic chip may include a 90° OH followed by two instances of the ODE 120 to operate as the optical front-end of a QM receiver, as described hereinabove with reference to FIG. 9. Furthermore, embodiments of an optical receiver according to the present disclosure may include two instances of the 90° OH, each followed by two instances of the ODE 120, or a variant thereof, to provide a dual-polarization operation.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

Figure 12:
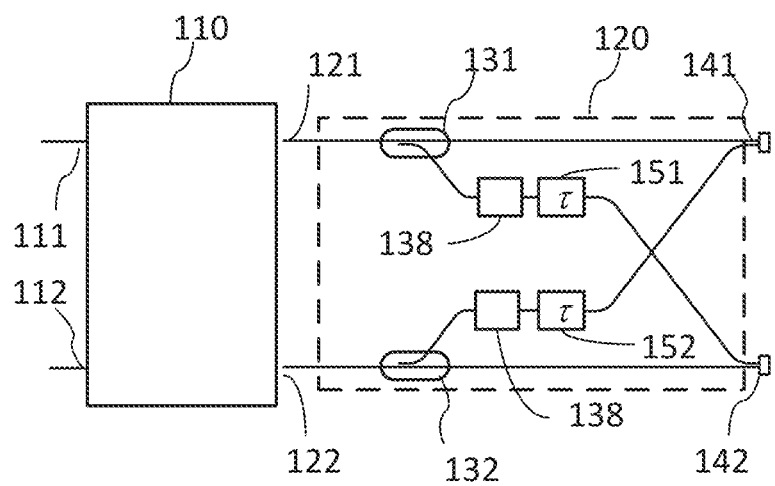
FIG. 12 is a schematic diagram of an embodiment of the optical receiver of FIG. 1 with variable optical delays and variable optical attenuators in the cross-coupling optical paths of the optical equalizer.

For example, it will be appreciated that different dielectric materials and semiconductor materials other than silicon, including but not limited to compound semiconductor materials of groups commonly referred to as A3B5 and A2B4, such as GaAs, InP, and their alloys and compounds may be used to fabricate the optical receiver circuits example embodiments of which are described hereinabove. Furthermore, some of the elements described hereinabove with reference to one or more embodiments may be omitted or replaced with another elements capable of similar functions, and another elements added. For example, in one or more embodiments the tuning of the amount of cross-coupling in an ODE interconnecting OH outputs with PDs may be implemented with non-tunable optical splitters or taps 131, 132 using one or more variable optical attenuators 138 inserted in one or both of the cross-coupling paths 181, 182, as illustrated in FIG. 12. In another example, in one or more embodiments using one or more tunable optical delays, tunable delay elements 151, 152 may be disposed in the direct optical paths 171, 172 as illustrated in FIG. 13, and may be operable to vary the relative time delay $\tau$ experiencing by the cross-coupled light relative to the direct propagating light, or to vary the relative time delay $\tau$ experiencing by the direct propagating light relative to the cross-coupled light. Time delays in the direct paths 171, 172 may be used in some embodiments to correct for a precursor ISI (inter-symbol interference). Time delays in the cross-coupling paths 181, 182 may be used in some embodiments to correct for a post-cursor ISI.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An optical coherent receiver comprising:
   a first and second back-end optical ports;
   an optical hybrid (OH) comprising a first input OH port, a second input OH port, a first output OH port, and a second output OH port; and,
   a first optical equalizer network that optically interconnects each of the first and second output OH ports with each of the first and second back-end optical ports.

2. The optical coherent receiver of claim 1, wherein the OH is configured to couple signal light received in the first input OH port and reference light received in the second input OH port into each of the first and second output OH ports with a relative phase shift between the signal and reference light that increments by 180° from the first output OH port to the second output OH port.

3. The optical coherent receiver of claim 2 comprising a photonic chip, the photonic chip comprising the optical hybrid and the first optical equalizer network, wherein the first optical equalizer network comprises optical waveguide paths that connect each of the first and second back-end optical ports to each of the first and second output OH ports, wherein at least two of the optical waveguide paths have unequal optical lengths so that light received at at least one of the first and second back-end optical ports from one of the first and second output OH ports is delayed by a time delay $\tau$ relative to light received from the other of the first and second output OH ports.

4. The optical coherent receiver of claim 3 wherein the first optical equalizer network comprises at least one tunable optical delay element.

5. The optical coherent receiver of claim 3 comprising a first optical splitter optically coupled to the first output OH port, and a second optical splitter optically coupled to the second output OH port.

6. The optical coherent receiver of claim 3 wherein the first optical equalizer network comprises at least one tunable optical element configured to tune at least one of: a fraction of light coupled from the first output OH port into the second back-end optical port, and a fraction of light coupled from the second output OH port into the first back-end optical port.

7. The optical coherent receiver of claim 6 wherein the at least one tunable optical element comprises at least one of: a tunable optical coupler, and a tunable optical attenuator.

8. The optical coherent receiver of claim 3 wherein the photonic chip is a silicon photonic chip.

9. The optical coherent receiver of claim 1 including at least one first photodetector (PD) optically coupled to the first back-end optical port and at least one second PD optically coupled to the second back-end optical port.

10. The optical coherent receiver of claim 3 further comprising:
    a first photodetector (PD) optically coupled to the first back-end optical port,
    a second PD optically coupled to the second back-end optical port, and
    a differential amplifier comprising a first input port electrically coupled to the at least one first PD and a second input port electrically coupled to the at least one second PD.

11. The optical coherent receiver of claim 10 wherein the differential amplifier comprises a trans-impedance amplifier.

12. The optical coherent receiver of claim 10 configured to receive the signal light modulated with a signal at a baud rate R, wherein the time delay $\tau$ is in a range of 0.1/R and 0.9/R.

13. The optical coherent receiver of claim 12 wherein the differential amplifier has an amplifier bandwidth B in a range of 0.2 R to 0.5 R, and wherein the first optical equalizer network is operable to boost a high-frequency component of the signal beyond the amplifier bandwidth B.

14. The optical coherent receiver of claim 10 wherein the first optical equalizer network is configured to couple a first tunable fraction of light from the first output OH port into the second back-end optical port and to couple a second tunable fraction of light from the second output OH port into the first back-end optical port, further comprising a controller configured to tune at least one of: the time delay τ, the first tunable fraction, and the second tunable fraction.

15. The optical coherent receiver of claim 10 wherein at least one of the first PD and the second PD comprises a dual-fed PD disposed to receive light from the first output OH port and from the second output OH port.

16. The optical coherent receiver of claim 10 comprising one or more optical combiners disposed to combine light from the first and second output OH ports and to couple combined light to the at least one first PD and the at least one second PD.

17. The optical coherent receiver of claim 1 wherein the optical hybrid comprises third and fourth OH output ports, further comprising:
 third and fourth back-end optical ports; and,
 a second optical equalizer network optically interconnecting each of the third and fourth output OH ports with each of the third and fourth back-end optical ports.

18. The optical coherent receiver of claim 17 wherein the optical hybrid comprises a 90 degree optical hybrid configured to couple signal light received in the first input OH port and reference light received in the second input OH port into each of the first, second, third, and fourth output OH ports with a relative phase shift between the signal and reference light at respective output OH ports that increments by 180° from the first output OH port to the second output OH port, and increments by 180° from the third output OH ports to the fourth output OH port.

19. The optical coherent receiver of claim 18 wherein:
 the first optical equalizer network comprises at least one optical tunable element configured for tuning at least one of: an optical time delay in the first optical equalizer network, and an optical coupling in the first optical equalizer network; and
 the second optical equalizer network comprises at least one optical tunable element configured for tuning at least one of: an optical time delay in the second optical equalizer network, and an optical coupling in the second optical equalizer network.

20. The optical coherent receiver of claim 19, further comprising:
 first, second, third, and fourth photodetectors (PD) optically coupled to the first, second, third, and fourth back-end optical ports, respectively;
 a first differential amplifier electrically coupled to the first and second PDs; and
 a second differential amplifier electrically coupled to the third and fourth PDs.

* * * * *